US010604652B2

(12) United States Patent
Han et al.

(10) Patent No.: US 10,604,652 B2
(45) Date of Patent: Mar. 31, 2020

(54) COMPOSITION FOR WINDOW FILM, FLEXIBLE WINDOW FILM FORMED THEREFROM, AND FLEXIBLE DISPLAY DEVICE COMPRISING SAME

(71) Applicants: SAMSUNG SDI CO., LTD., Yongin-si, Gyeonggi-do (KR); SAMSUNG ELECTRONICS CO., LTD., Suwon-si, Gyeonggi-do (KR)

(72) Inventors: Dong Il Han, Suwon-si (KR); Kyoung Ku Kang, Suwon-si (KR); Min Hye Kim, Suwon-si (KR); Ji Hwan Park, Suwon-si (KR); Chang Soo Woo, Suwon-si (KR); Ji Sun Im, Suwon-si (KR); Seung Woo Jang, Suwon-si (KR)

(73) Assignees: Samsung SDI Co., Ltd., Yongin-si (KR); Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/553,935

(22) PCT Filed: Apr. 22, 2016

(86) PCT No.: PCT/KR2016/004226
§ 371 (c)(1),
(2) Date: Aug. 25, 2017

(87) PCT Pub. No.: WO2016/175509
PCT Pub. Date: Nov. 3, 2016

(65) Prior Publication Data
US 2018/0030273 A1   Feb. 1, 2018

(30) Foreign Application Priority Data

Apr. 30, 2015   (KR) .................. 10-2015-0062125

(51) Int. Cl.
| | | |
|---|---|---|
| C08L 83/06 | (2006.01) | |
| C08J 7/04 | (2020.01) | |
| C08G 77/50 | (2006.01) | |
| C08G 77/14 | (2006.01) | |
| C08J 5/18 | (2006.01) | |
| C08L 83/10 | (2006.01) | |

(52) U.S. Cl.
CPC .............. C08L 83/06 (2013.01); C08G 77/14 (2013.01); C08G 77/50 (2013.01); C08J 5/18 (2013.01); C08J 7/047 (2013.01); C08L 83/10 (2013.01); C08J 2367/02 (2013.01); C08J 2483/06 (2013.01)

(58) Field of Classification Search
CPC ........... C08G 77/14; C08L 83/06; C08J 7/042
See application file for complete search history.

(56) References Cited

U.S. PATENT DOCUMENTS

| | | | |
|---|---|---|---|
| 5,280,098 A | 1/1994 | Witucki et al. | |
| 5,516,858 A | 5/1996 | Morita et al. | |
| 5,891,969 A | 4/1999 | Mine et al. | |
| 6,210,790 B1 | 4/2001 | Crivello | |
| 2008/0113188 A1* | 5/2008 | Shah ..................... | C08J 7/04 428/336 |
| 2015/0207102 A1 | 7/2015 | Jeong et al. | |
| 2016/0102226 A1 | 4/2016 | Alvarez et al. | |

FOREIGN PATENT DOCUMENTS

| | | |
|---|---|---|
| JP | 2000-328000 A | 11/2000 |
| JP | 2007-176542 A | 7/2007 |
| KR | 10-2011-0118144 A | 10/2011 |
| KR | 10-2011-0122820 A | 11/2011 |
| KR | 10-2012-0021721 A | 3/2012 |
| KR | 10-2014-0004568 A1 | 1/2014 |
| KR | 10-2014-0104175 A | 8/2014 |
| KR | 10-2015-0068240 A | 6/2015 |
| KR | 10-2015-0088101 A | 7/2015 |
| KR | 10-1845081 | 4/2018 |
| WO | WO 2014/186514 A1 | 11/2014 |

OTHER PUBLICATIONS

Korean Office action in corresponding Korean Application No. 10-2015-0062125, Korean Office action dated Jun. 29, 2018 (2 pgs.).
English translation of International Preliminary Report on Patentability for corresponding International Application No. PCT/KR2016/004226, filed Apr. 22, 2016, International Preliminary Report on Patentability dated Oct. 31, 2017 (8 pgs.).
International Search Report dated Jul. 21, 2016 for corresponding International Application PCT/KR2016/004226, including Eng. translation, 6pp.
Written Opinion dated Jul. 21, 2016 for corresponding International Application PCT/KR2016/004226, 4pp.
U.S. Notice of Allowance dated Oct. 3, 2019, issued in U.S. Appl. No. 15/745,699 (5 pages).
KR Office action from corresponding Korean Patent Application No. 10-2015-0109757, dated Jul. 30, 2018, 2 pages.
English Translation of Written Opinion for corresponding International application No. PCT/KR2016/008015, dated Oct. 20, 2016, 8 pages.
International Search Report for corresponding International application No. PCT/KR2016/008015, dated Oct. 20, 2016, including Eng. trans. 5 pages.
Written Opinion for corresponding International application No. PCT/KR2016/008015, dated Oct. 20, 2016, 6 pages.

* cited by examiner

*Primary Examiner* — Kuo Liang Peng
(74) *Attorney, Agent, or Firm* — Lewis Roca Rothgerber Christie LLP (57) ABSTRACT

A composition for a window film including a first silicon resin including a compound represented by Formula 1; a second silicon resin including a crosslinkable functional group and at least one of a Q unit and a bridge unit; a crosslinking agent; and an initiator, a flexible window film formed therefrom, and a flexible display device including the same are disclosed.

13 Claims, 3 Drawing Sheets

COMPOSITION FOR WINDOW FILM, FLEXIBLE WINDOW FILM FORMED THEREFROM, AND FLEXIBLE DISPLAY DEVICE COMPRISING SAME

CROSS-REFERENCE TO RELATED APPLICATIONS

This application is a National Phase Patent application and claims priority to and the benefit of International Application Number PCT/KR2016/004226, filed on Apr. 22, 2016, which claims priority to and the benefit of Korean Application No. 10-2015-0062125, filed on Apr. 30, 2015, the entire contents of each of which are incorporated herein by reference.

BACKGROUND

1. Field

The invention relates to a composition for a window film, a flexible window film formed using the same, and a flexible display device including the same.

2. Description of the Related Art

Recently, glass substrates or high-hardness substrates in display devices are being replaced by films in order to develop flexible display devices capable of being folded and unfolded. Since the flexible display devices are thin, lightweight, impact resistant, foldable and unfoldable, these flexible display devices may be manufactured into various shapes.

For the flexible display devices, various elements and substrates included therein are also required to have flexibility. In particular, a window film which is disposed at the outermost side of the flexible display device needs to have flexibility and high hardness. The window film is prepared from coating a composition for the window film on a base layer, followed by curing the composition. During the processes, curl of the window film may occur.

One example of the related art is disclosed in Japanese Patent Laid-Open Publication No. 2007-176542.

SUMMARY

The invention provides a composition for a window film which may embody a flexible window film exhibiting high hardness and good flexibility.

The invention provides a composition for a window film which may embody a flexible window film exhibiting low curl.

The invention provides a flexible window film exhibiting high hardness, good flexibility, and low curl.

The invention provides a flexible display device including the flexible window film.

One aspect of the invention relates to a composition for a window film including a first silicon resin including a compound represented by following Formula 1; a second silicon resin including a crosslinkable functional group and at least one of a Q unit and a bridge unit; a crosslinking agent; and an initiator:

$(R^1SiO_{3/2})_x(R^2R^3SiO_{2/2})_y(R^4R^5R^6SiO_{1/2})_z$      <Formula 1>

(In Formula 1, $R^1$, $R^2$, $R^3$, $R^4$, $R^5$, $R^6$, x, y and z are as defined in the following detailed description.)

Another aspect of the invention relates to a flexible window film including a base layer and a coating layer formed on the base layer, and the coating layer may be formed from the composition for the window film.

Another aspect of the invention relates to a flexible display device including the flexible window film.

The invention provides a composition for a window film which may embody a flexible window film exhibiting high hardness and good flexibility.

The invention provides a composition for a window film which may embody a flexible window film exhibiting low curl.

The invention provides a flexible window film exhibiting high hardness, good flexibility, and low curl.

The invention provides a flexible display device including the flexible window film.

DETAILED DESCRIPTION

Exemplary embodiments of the invention are described in detail with reference to the accompanying drawings. It is understood that the invention is not limited to the following embodiments and may be embodied in different ways. In the drawings, portions irrelevant to the description are omitted for clarity. Like components are denoted by like reference numerals throughout the specification.

As used herein, spatially relative terms such as "upper portion" and "lower portion" are defined with reference to the accompanying drawings. Thus, it is understood that the term "upper portion" can be used interchangeably with the term "lower portion". It is understood that when an element such as a layer, film, region or substrate is referred to as being placed "on" another element, it can be placed directly on the other element, or intervening layer(s) may be present. On the other hand, when an element is referred to as being placed "directly on" another element, intervening layer(s) are not present.

Herein, "pencil hardness" is measured on a coating layer of a window film using a pencil hardness tester (Heidon Co., Ltd.) in accordance with JIS K5400. In measuring pencil hardness, pencils (Mitsubishi Co., Ltd.) having a pencil hardness of 6B to 9H are used. Specifically, pencil hardness is measured under a load of 1 kg on the coating layer, a scratching angle of 45°, and a scratching speed of 60 mm/min. When the coating layer has one or more scratches after being tested 5 times using a certain pencil, the pencil hardness is measured again using another pencil having a hardness one-level lower than the previous pencil. The maximum pencil hardness value of the pencil that allows no scratches to be observed all five times on the coating layer is taken as the pencil hardness of the coating layer after pencil hardness is repeatedly measured five times.

As used herein, the term "radius of curvature" refers to a minimum radius of the jig that causes no cracks on a window film specimen subjected to radius of curvature testing. In particular, the radius of curvature test involves winding the window film specimen around the jig (CFT-200R, Covotech Co., Ltd.), keeping it wound for 5 seconds, unwinding, and then observing with the naked eye whether the specimen suffers from cracking. Here, the radius of curvature in the compressive direction is measured when the specimen is wound around the jig such that the coating layer of the window film contacts the surface of the jig. The radius of curvature in the tensile direction is measured when the specimen is wound around the jig such that the base layer of the window film contacts the jig. Here, the window film specimen may have a thickness of 50 μm to 300 μm.

Figure 7:
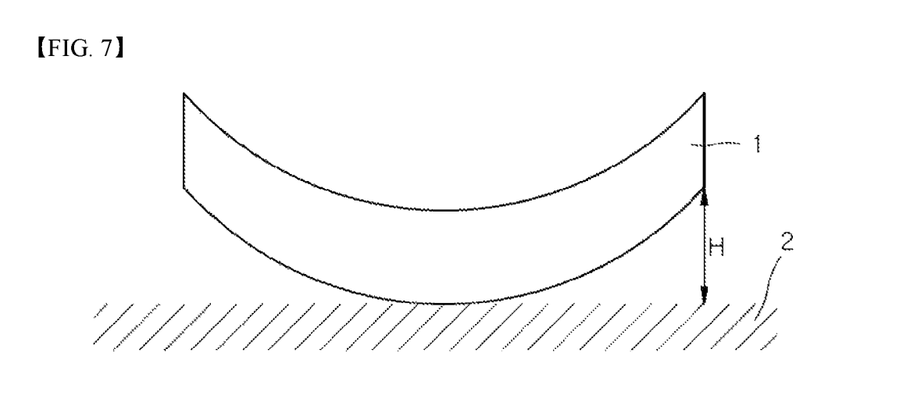
FIG. 7 is a diagram illustrating how to measure curl of a window film.

As used herein, referring to FIG. 7, the term "curl" refers to a maximum height (H) from a floor 2 to a corner of a window film 1 when the window film 1 (having length×width×thickness of 3 cm×15 cm×130 μm, base layer thickness: 80 μm, coating layer thickness: 50 μm) is placed on the floor 2, followed by being left at 25° C. and 40% relative humidity.

As used herein, the term "(meth)acryl" refers to acryl and/or methacryl.

Unless otherwise stated, the term "substituted" as used herein means that at least one hydrogen atom of the functional group is substituted with a hydroxyl group, a non-substituted $C_1$ to $C_{10}$ alkyl group, a $C_1$ to $C_{10}$ alkoxy group, a $C_3$ to $C_{10}$ cycloalkyl group, a non-substituted $C_6$ to $C_{20}$ aryl group, a $C_7$ to $C_{20}$ arylalkyl group, a $C_1$ to $C_{10}$ alkyl group-substituted $C_6$ to $C_{20}$ aryl group, or a $C_1$ to $C_{10}$ alkoxy group-substituted $C_1$ to $C_{10}$ alkyl group.

As used herein, the term "crosslinkable functional group" refers to functional groups crosslinked by heat and/or light. For example, the crosslinkable functional group may refer to an epoxy group, an epoxy group-containing functional group, an oxetanyl group, an oxetanyl group-containing functional group, or the like. As used herein, the term "epoxy-group-containing functional group" refers to a glycidyl group, a glycidoxy group, an epoxidized $C_4$ to $C_{20}$ (for example $C_5$ to $C_{20}$) cycloalkyl group, a glycidyl group-containing $C_1$ to $C_{20}$ alkyl group, a glycidoxy group-containing $C_1$ to $C_{20}$ alkyl group, an epoxidized $C_4$ to $C_{20}$ (for example $C_5$ to $C_{20}$) cycloalkyl group-containing $C_1$ to $C_{20}$ alkyl group, a glycidyl group containing-$C_5$ to $C_{20}$ cycloalkyl group, a glycidoxy group-containing $C_5$ to $C_{20}$ cycloalkyl group, or an epoxidized $C_4$ to $C_{20}$ (for example $C_5$ to $C_{20}$) cycloalkyl group-containing $C_5$ to $C_{20}$ cycloalkyl group. As used herein, the term "oxetanyl group-containing functional group" refers to an oxetanyloxy group, an oxetanyl group-containing $C_1$ to $C_{20}$ alkyl group, an oxetanyloxy group-containing $C_1$ to $C_{20}$ alkyl group, an oxetanyl group-containing $C_5$ to $C_{20}$ cycloalkyl group, an oxetanyloxy group-containing $C_5$ to $C_{20}$ cycloalkyl group. As used herein, the symbol "Gp" represents a glycidoxypropyl group, the symbol "Ec" represents an epoxycyclohexylethyl group, the symbol "Me" represents a methyl group, and the symbol "Et" represents an ethyl group. As used herein, the term "halogen" refers to fluorine, chlorine, bromine, or iodine.

Hereinafter, a composition for a window film according to embodiments of the invention will be described.

According to embodiments of the invention, the composition for a window film may include a first silicon resin including a compound represented by following Formula 1; a second silicon resin including a crosslinkable functional group and at least one of a Q unit and a bridge unit; a crosslinking agent; and an initiator:

<Formula 1>

(In Formula 1, $R^1$ is an epoxy group, or an epoxy-group containing functional group, $R^2$ and $R^3$ are each independently hydrogen, a crosslinkable functional group, a substituted or non-substituted $C_1$ to $C_{20}$ alkyl group, or a substituted or non-substituted $C_5$ to $C_{20}$ cycloalkyl group, $R^4$, $R^5$ and $R^6$ are each independently hydrogen, a crosslinkable functional group, a substituted or non-substituted $C_1$ to $C_{20}$ alkyl group, a substituted or non-substituted $C_5$ to $C_{20}$ cycloalkyl group, or a substituted or non-substituted $C_6$ to $C_{30}$ aryl group, at least one of $R^4$, $R^5$ and $R^6$ is a crosslinkable functional group, $0 < x \leq 1$, $0 \leq y < 1$, $0 \leq z < 1$, and $x+y+z=1$).

The composition for the window film according to embodiments of the invention may include both the first silicon resin and the second silicon resin, which may embody a window film having good flexibility, high hardness and low curl. As used herein, the term "bridge unit" refers to a unit in which Si is connected to Si through an aliphatic hydrocarbon, an alicyclic hydrocarbon, or an aromatic hydrocarbon, rather than Si being directly connected to Si. The first silicon resin, the second silicon resin, the crosslinking agent, and the initiator are all different from each other.

The first silicon resin may function a binder for forming the window film and may be represented by Formula 1 above. The first silicon resin may include $R^1$ group, which may increase the hardness of the window film and reduce the radius of curvature of the window film, thereby improving the flexibility of the window film. When the first silicon resin includes $R^2$ and $R^3$ groups, crosslinkability and flexibility are imparted to the window film, thereby improving the hardness and the flexibility of the window film. When the first silicon resin includes $R^4$, $R^5$ and $R^6$ groups, the window film may have further improved crosslinking density.

The first silicon resin may be used alone or in combinations thereof in the composition for the window film. The first silicon resin may have a weight average molecular weight of about 2,000 to about 20,000, specifically about 4,500 to about 10,000, more specifically about 5,000 to about 8,000, about 5,000 to about 7,000. Within this range, the coating layer of the window film may be well supported. The first silicon resin may have a polydispersity index (PDI) of about 1.0 to about 3.0, specifically about 1.5 to about 2.5. The first silicon resin may have an epoxy equivalent of about 0.1 mol/100 g to about 1.0 mol/100 g, specifically about 0.3 mol/100 g to about 0.8 mol/100 g. Within these ranges, the composition may have good coatability and the window film may have stable coating properties. The first silicon resin may be present in an amount of about 30 mol % to about 99 mol %, specifically about 50 mol % to about 90 mol %, specifically about 70 mol % to about 80 mol %, based on the total amount of the composition for the window film in terms of solids content. Within this range, the hardness and the flexibility of the window film may improve and the curl may be reduced.

In some embodiments, the first silicon resin may be a silicon resin including a T unit, as represented by following Formula 1-1:

<Formula 1-1>

(in Formula 1-1, $R^1$ is as defined in Formula 1 above).

Specifically, $R^1$ may be a glycidyl group-containing $C_1$ to $C_{20}$ alkyl group, a glycidoxy group-containing $C_1$ to $C_{20}$ alkyl group, or an epoxidized $C_4$ to $C_{20}$ cycloalkyl group-containing $C_1$ to $C_{20}$ alkyl group. More specifically, $R^1$ may be a glycidoxypropyl group or an epoxycyclohexylethyl group. For example, the first silicon resin may include at least one of a silicon resin including a T unit represented by $GpSiO_{3/2}$, and a silicon resin including a T unit represented by $EcSiO_{3/2}$.

The first silicon resin may be prepared through hydrolysis and condensation reaction of a first silicon monomer. The first silicon monomer may include a silane compound having $R^1$ group of Formula 1 above. Specifically, the first silicon monomer may be represented by following Formula 2. These can be used alone or in combinations thereof.

$$SiR^1R^7R^8R^9 \qquad \text{<Formula 2>}$$

(In Formula 2, $R^1$ is as defined in Formula 1 above, and $R^7$, $R^8$ and $R^9$ are each independently a halogen, a hydroxyl group, or a $C_1$ to $C_{10}$ alkoxy group). More specifically, examples of the first silicon monomer may include trialkoxysilane compounds, for example (3-glycidoxypropyl)trimethoxysilane, (3-glycidoxypropyl)triethoxysilane, 2-(3,4-epoxycyclohexyl)ethyltrimethoxysilane, 2-(3,4-epoxycyclohexyl)ethyltriethoxysilane or the like, without being limited thereto.

Hydrolysis and condensation reaction of the monomer may be performed according to any suitable methods for preparing a silicon resin. Hydrolysis may include reacting the first silicon monomer in a mixture of water and at least one of a predetermined acid and/or base. For example, the acid may include a strong acid such as hydrochloric acid (HCl), nitric acid ($HNO_3$), acetic acid or the like, and the base may include a strong base such as sodium hydroxide (NaOH), potassium hydroxide (KOH), ammonium hydroxide ($NH_4OH$) or the like. Hydrolysis may be performed at about 20° C. to about 100° C. for about 10 minutes to about 7 hours. Within this range, the efficiency of hydrolysis of the first silicon monomer may improve. Condensation reaction may be performed at about 20° C. to about 100° C. for about 10 minutes to about 12 hours under the same conditions as the hydrolysis reaction. Within this range, the efficiency of condensation reaction of the first silicon monomer may improve.

In some embodiments, the first silicon resin may comprise a silicon resin including a T unit and a D unit, as represented by following Formula 1-2:

$$(R^1SiO_{3/2})_x(R^2R^3SiO_{2/2})_y \qquad \text{<Formula 1-2>}$$

(In Formula 1-2, $R^1$, $R^2$ and $R^3$ are as defined in Formula 1 above, 0<x<1, 0<y<1, and x+y=1).

Specifically, $R^1$ is as defined in Formula 1-1 above. $R^2$ and $R^3$ are each independently a substituted or non-substituted $C_1$ to $C_{20}$ alkyl group. In this case, the window film may have good flexibility. $R^2$ may be a substituted or non-substituted $C_1$ to $C_{20}$ alkyl group, and $R^3$ may be an epoxy group, or an epoxy group-containing functional group. In this case, the composition for the window film may have better crosslinkability and further improve the hardness of the window film. More specifically, $R^2$ and $R^3$ may be each independently a methyl group, an ethyl group, (3,4-epoxycyclohexyl)methyl group, (3,4-epoxycyclohexyl)ethyl group, (3,4-epoxycyclohexyl)propyl group, glycidoxypropyl group or the like.

Specifically, the first silicon resin may be represented by any one of following Formulae 1-2A to 1-2H:

$$(GpSiO_{3/2})_x(EcMeSiO_{2/2})_y \qquad \text{<Formula 1-2A>}$$

$$(GpSiO_{3/2})_x((Me)_2SiO_{2/2})_y \qquad \text{<Formula 1-2B>}$$

$$(GpSiO_{3/2})_x(MeEtSiO_{2/2})_y \qquad \text{<Formula 1-2C>}$$

$$(GpSiO_{3/2})_x(GpMeSiO_{2/2})_y \qquad \text{<Formula 1-2D>}$$

$$(EcSiO_{3/2})_x(EcMeSiO_{2/2})_y \qquad \text{<Formula 1-2E>}$$

$$(EcSiO_{3/2})_x((Me)_2SiO_{2/2})_y \qquad \text{<Formula 1-2F>}$$

$$(EcSiO_{3/2})_x(MeEtSiO_{2/2})_y \qquad \text{<Formula 1-2G>}$$

$$(EcSiO_{3/2})_x(GpMeSiO_{2/2})_y \qquad \text{<Formula 1-2H>}$$

(In Formulae 1-2A to 1-2H above, 0<x<1, 0<y<1, and x+y=1).

Specifically, in Formulae 1-2 above, x and y may be about $0.20 \leq x \leq 0.999$ and about $0.001 \leq y \leq 0.80$, specifically about $0.20 \leq x \leq 0.99$ and about $0.01 \leq y \leq 0.80$, more specifically about $0.50 \leq x \leq 0.99$ and about $0.01 \leq y \leq 0.50$. Within this range, the hardness and the flexibility of the window film may improve.

The first silicon resin may be prepared through hydrolysis and condensation reaction of a monomer mixture including a first silicon monomer and a second silicon monomer. The first silicon monomer may be present in the monomer mixture in an amount of about 20 mol % to about 99.9 mol %, specifically about 20 mol % to about 99 mol %, more specifically about 50 mol % to about 99 mol %, and the second silicon monomer may be present in the monomer mixture in an amount of about 0.1 mol % to about 80 mol %, specifically about 1 mol % to about 80 mol %, more specifically about 1 mol % to about 50 mol %. Within this range, the flexibility of the window film may improve while the hardness of the window film is guaranteed. The first silicon monomer may be represented by Formula 2 above. These can be used alone or in combinations thereof. The second silicon monomer may be represented by following Formula 3. These can be used alone or in combinations thereof:

$$SiR^2R^3R^{10}R^{11} \qquad \text{<Formula 3>}$$

(In Formula 3, $R^2$ and $R^3$ are as defined in Formula 1 above, and $R^{10}$ and $R^{11}$ are each independently a halogen, a hydroxyl group, or a $C_1$ to $C_{10}$ alkoxy group). More specifically, the second silicon monomer may include a dialkoxysilane compound such as dimethyldimethoxysilane, 2-(3,4-epoxycyclohexyl)ethylmethyldiethoxysilane, (3-glycidoxypropyl)methyldiethoxysilane or the like, without being limited thereto.

In some embodiments, the first silicon resin may be a silicon resin including a T unit and an M unit, as represented by following Formula 1-3:

$$(R^1SiO_{3/2})_x(R^4R^5R^6SiO_{1/2})_z \qquad \text{<Formula 1-3>}$$

(In Formula 1-3 above, $R^1$, $R^4$, $R^5$ and $R^6$ are as defined in Formula 1 above, 0<x<1, 0<z<1, and x+z=1).

Specifically, $R^1$ is as defined in Formula 1-1 above. Specifically, $R^4$, $R^5$ and $R^6$ are each independently an epoxy group, an epoxy group-containing functional group, or a substituted or non-substituted $C_1$ to $C_{20}$ alkyl group, and at least one of $R^4$, $R^5$ and $R^6$ is an epoxy group, or an epoxy group-containing functional group. More specifically, $R^4$, $R^5$ and $R^6$ may be each independently a 3-glycidoxypropyl group, a 2-(3,4-epoxycyclohexyl)ethyl group, a methyl group, an ethyl group or the like. Specifically, in Formula 1-3 above, x and z may be about $0.80 \leq x \leq 0.9999$ and about $0.0001 \leq z \leq 0.20$, more specifically about $0.90 \leq x \leq 0.999$ and about $0.001 \leq z \leq 0.10$. Within this range, crosslinking density of the window film may improve.

The first silicon resin may be prepared through hydrolysis and condensation reaction of a monomer mixture including a first silicon monomer and a third silicon monomer. The first silicon monomer may be present in the monomer mixture in an amount of about 80 mol % to about 99.99 mol %, specifically about 90 mol % to about 99.9 mol %, and the third silicon monomer may be present in the monomer mixture in an amount of about 0.01 mol % to about 20 mol %, specifically 0.1 mol % to about 10 mol %. Within this range, crosslinking density of the window film may improve. The first silicon monomer may be represented by Formula 2 above. These can be used alone or in combinations thereof. The third silicon monomer may be represented by following Formula 4. These can be used alone or in combinations thereof:

$$R^4R^5R^6Si-O-SiR^4R^5R^6 \qquad \text{<Formula 4>}$$

(In Formula 4 above, $R^4$, $R^5$ and $R^6$ are as defined in Formula 1 above).

For example, the third silicon monomer may include a disiloxane compound including two M units. Example of the third silicon monomer may include 1,3-bis(glycidoxypropyl)tetramethyldisiloxane, 1,3-bis[2-(3,4-epoxycyclohexyl)ethyl]tetramethyldisiloxane or the like, without being limited thereto.

The second silicon resin may include a silicon resin including a crosslinkable functional group and at least one of a Q unit and a bridge unit. By including above stiff structure, the second silicon resin may be cured together with the first silicon resin to improve the hardness of the window film and reduce the curl of the window film. The second silicon resin may be used alone or in combinations thereof in the composition for the window film.

The second silicon resin may have a weight average molecular weight of about 1,000 to about 20,000, specifically about 1,500 to about 15,000, more specifically about 2,000 to about 6,000, more specifically about 3,000 to 6,000, about 3,000 to about 5,000, about 3,000 to about 4,000. Within this range, the hardness of the window film may improve and the curl of the window film may be reduced. The second silicon resin may have a polydispersity index (PDI) of about 1.0 to about 3.5, specifically about 1.5 to about 3.0. The second silicon resin may have an epoxy equivalent of about 0.1 mol/100 g to about 2.0 mol/100 g, specifically about 0.4 mol/100 g to about 1.5 mol/100 g. Within these ranges, the window film may have high hardness and low curl. The second silicon resin may be present in an amount of about 0.1 wt % to about 50 wt %, specifically about 1 wt % to about 30 wt %, more specifically about 1 wt % to about 20 wt %, more specifically about 1 wt % to about 15 wt %, based on the total amount of the composition for the window film in terms of solids content. Within this range, window film may have improved hardness and the flexibility of the reduced haze increase.

In some embodiments, the second silicon resin may include a Q unit represented by $SiO_{4/2}$ and a crosslinkable functional group. Specifically, the second silicon resin may be represented by following Formula 5:

<Formula 5>

(In Formula 5, * is a connecting portion of an element, $R^{12}$, $R^{13}$, $R^{14}$, $R^{15}$, $R^{16}$ and $R^{17}$ are each independently a crosslinkable functional group, or a substituted or non-substituted $C_1$ to $C_{10}$ alkyl group, at least one of $R^{12}$, $R^{13}$ and $R^{14}$ is a crosslinkable functional group, at least one of $R^{15}$, $R^{16}$ and $R^{17}$ is a crosslinkable functional group, and n is an integer of 10 to 200).

Specifically, $R^{12}$, $R^{13}$ and $R^{14}$ are each independently an epoxy group, an epoxy group-containing functional group, or a non-substituted $C_1$ to $C_{10}$ alkyl group, and more specifically, $R^{12}$, $R^{13}$ and $R^{14}$ are each independently a glycidylpropyl group, an epoxycyclohexylethyl group, or a methyl group. Specifically, $R^{15}$, $R^{16}$ and $R^{17}$ are each independently an epoxy group, an epoxy group-containing functional group, or a non-substituted $C_1$ to $C_{10}$ alkyl group and more specifically, $R^{15}$, $R^{16}$ and $R^{17}$ are each independently a glycidylpropyl group, an epoxycyclohexylethyl group, or a methyl group. The second silicon resin may be represented by following Formulae 5-1 or 5-2, without being limited thereto. The second silicon resin may be represented by following Formula 5-1 or following Formula 5-2, without being limited thereto:

<Formula 5-1>

<Formula 5-2>

(In Formulae 5-1 and 5-2 above, * is a connecting portion of an element, and n is an integer of 10 to 200).

The second silicon resin may be prepared from any suitable method known in the art. For example, the second silicon resin may be prepared by a reaction of a mixture of tetraalkoxysilane and tetraalkyldisiloxane with a vinyl compound having a crosslinkable functional group. In another example, the second silicon resin may be prepared from a reaction of Hydride Q resin (HQM-107, Gelest, Inc.) with a vinyl compound having a crosslinkable functional group. Examples of tetraalkoxysilane may include at least one of tetramethoxysilane, tetraethoxysilane, tetrapropoxysilane, and tetrabutoxysilane. Examples of tetraalkyldisiloxane may include at least one of 1,1,3,3-tetramethyldisiloxane, and tetrapropyldisiloxane. The vinyl compound having a crosslinkable functional group may include at least one of 4-vinylcyclohexene epoxide, and allyl glycidyl ether. A platinum catalyst may further be used to improve production yield of the second silicon resin. The platinum catalyst may be a vinylalkylsilane platinum complex including Karstedt catalyst, platinum black, chloroplatinic acid, a chloroplatinic acid-olefin complex, a chloroplatinic acid-alcohol complex, or mixtures thereof.

In some embodiments, the second silicon resin may include a bridge unit and a crosslinkable functional group. Specifically, the second silicon resin may include a compound represented by following Formula 6:

<Formula 6>

(In Formula 6 above, * is a connecting portion of an element,
$R^{18}$ is a substituted or non-substituted $C_1$ to $C_{20}$ alkylene group, a substituted or non-substituted $C_2$ to $C_{20}$ alkenylene group, a substituted or non-substituted $C_2$ to $C_{20}$ alkynylene group, a substituted or non-substituted $C_6$ to $C_{20}$ arylene group, a substituted or non-substituted $C_7$ to $C_{30}$ arylalkylene group, or a substituted or non-substituted $C^3$ to $C^{20}$ cycloalkylene group, $R^{12}$, $R^{13}$, $R^{14}$, $R^{15}$, $R^{16}$ and $R^{17}$ are as defined in Formula 5 above, and
n is an integer of 15 to 120).

For example, in Formula 6 above, $R^{18}$ is an ethylene group, a propylene group, a butylene group, a pentylene group, a hexylene group, a heptylene group, an octylene group, a nonylene group, a decylene group, a phenylene group, a naphthylene group, (wherein * is a connecting portion of an element, and m and n are each independently an integer of 1 to 10), or the like.

Specifically, n is an integer of 20 to 80.

For example, the second silicon resin may be represented by following Formulae 6-1 or 6-2:

(wherein in Formulae 6-1 and 6-2 above, * is a connecting portion of an element, and n is an integer of 15 to 120).

The second silicon resin may be prepared from any suitable method known in the art. For example, the second silicon resin may be prepared from a reaction of a mixture of 1,2-bis(triethoxysilyl)ethane and 1,1,3,3-tetramethyldisiloxane with a vinyl compound having a crosslinkable functional group such as 4-vinyl-1-cyclohexene epoxide, and allyl glycidyl ether, without being limited thereto. The above-mentioned platinum catalyst may be used to increase production yield of the second silicon resin.

Hereinafter, a crosslinking agent will be described in detail.

The crosslinking agent may contain a crosslinkable functional group, thereby curing with the first silicon resin and the second silicon resin to improve the hardness of the window film. The crosslinking agent may further include at least one of an acyclic aliphatic hydrocarbon, a cyclic aliphatic hydrocarbon, and a hydrogenated aromatic hydrocarbon, thereby further improving the flexibility of the coating layer.

Specifically, the crosslinking agent may include at least one of an acyclic aliphatic epoxy monomer, a cyclic aliphatic epoxy monomer, a hydrogenated aromatic hydrocarbon epoxy monomer, and an oxetane monomer. These can be used alone or in combinations thereof.

Examples of the acyclic aliphatic epoxy monomer may include 1,4-butanediol diglycidyl ether, 1,6-hexanediol diglycidyl ether, neopentylglycol diglycidyl ether, trimethylolpropanetriglycidyl ether, polyethyleneglycol diglycidyl ether, glycerin triglycidyl ether, polypropylene glycol diglycidyl ether; polyglycidyl ethers of polyether polyols obtained by adding at least one or two more alkylene oxide to an aliphatic polyhydric alcohol such as ethylene glycol, propylene glycol, and glycerin; diglycidyl esters of long-chain aliphatic dibasic acids; monoglycidyl ethers of aliphatic higher alcohols; glycidyl ethers of higher fatty acids; epoxidized soybean oil; butyl epoxy stearate; octyl epoxy stearate; epoxidized linseed oil; epoxidized polybutadiene; or the like.

The cyclic aliphatic epoxy monomer may be a compound in which an alicyclic group has at least one epoxy group, and may include alicyclic epoxy carboxylate, alicyclic epoxy (meth)acrylate, or the like. More specifically the cyclic aliphatic epoxy monomer may include (3,4-epoxycyclohexyl)methyl-3',4'-epoxycyclohexanecarboxylate, diglycidyl 1,2-cyclohexanedicarboxylate, 2-(3,4-epoxycyclohexyl-5,5-spiro-3,4-epoxy)cyclohexane-meta-dioxane, bis(3,4-epoxycyclohexylmethyl)adipate, bis(3,4-epoxy-6-methylcyclohexyl)adipate, 3,4-epoxy-6-methylcyclohexylmethyl-3',4'-epoxy-6'-m ethylcyclohexanecarboxylate, ε-caprolactone-modified 3,4-epoxycyclohexylmethyl-3',4'-epoxy-cyclohexanecarboxylate, trim ethylcaprolactone-modified 3,4-epoxycyclohexylmethyl-3',4'-epoxycyclohexanecarboxylate, β-methyl-δ- valerolactone-modified 3,4-epoxycyclohexylmethyl-3',4'-epoxycyclohexanecarboxylate, 1,4-cyclohexanedimethanol bis(3,4-epoxycyclohexanecarboxylate, di(3,4-epoxycyclohexylmethyl)ether of ethylene glycol, ethylenebis(3,4-epoxycyclohexanecarboxylate), 3,4-epoxycyclohexylmethyl (meth)acrylate, 4-vinylcyclohexenedioxide, vinylcyclohexenemonoxide, 1,4-cyclohexanedimethanol diglycidyl ether or the like. Particularly, use of a bulky structure such as an epoxy monomer including cyclohexyl dicarboxylate may reduce the curl of the flexible window film. Specifically, diglycidyl 1,2-cyclohexanedicarboxylate, 1,4-cyclohexanedimethanol diglycidyl ether, 2,2'-((1-methylethyldiene)bis(cyclohexane-4,1-diyloxymethylene)) bisoxirane or the like may be used.

As used herein, the hydrogenated aromatic hydrocarbon epoxy monomer may refer to a monomer obtained through selective hydrogenation of an aromatic epoxy monomer in the presence of a catalyst under pressure. Examples of the aromatic epoxy monomer may include a bisphenol epoxy resin such as bisphenol A diglycidyl ether, bisphenol F diglycidyl ether, bisphenol S diglycidyl ether or the like; a novolac epoxy resin such as a phenol novolac epoxy resin, a cresol novolac epoxy resin, a hydroxybenzaldehydephenol novolac epoxy resin or the like; a polyfunctional epoxy resin such as tetrahydroxyphenylmethane glycidyl ether, tetrahydroxybenzophenone glycidyl ether, epoxidized polyvinyl phenol or the like.

Examples of the oxetane monomer may include 3-methyloxetane, 2-methyloxetane, 2-ethylhexyloxetane, 3-oxetanol, 2-methyleneoxetane, 3,3-oxetanedimethanethiol, 4-(3-methyloxetan-3-yl)benzonitrile, N-(2,2-d imethylpropyl)-3-methyl-3-oxetane methaneamine, N-(1,2-dimethylbutyl)-3-methyl-3-oxetane methaneamine, (3-ethyloxetan-3-yl) methyl(meth)acrylate, 4-[(3-ethyloxetan-3-yl)methoxy] butan-1-ol, 3-ethyl-3-hydroxymethyloxetane, xylenebisoxetane, and 3-[ethyl-3[[(3-ethyloxetan-3-yl]methoxy] methyl]oxetane, without being limited thereto.

The crosslinking agent may be present in an amount of about 0.1 wt % to about 50 wt %, specifically about 0.5 wt % to about 30 wt %, more specifically about 1 wt % to about 25 wt %, more specifically about 5 wt % to about 20 wt %, based on the total weight of the window film in terms of solids content. Within this range, the crosslinking agent may improve the flexibility and the hardness of the coating layer.

The initiator may cure the first silicon resin, the second silicon resin, and the crosslinking agent. The initiator may include at least one of a cationic photo initiator and a radical photo initiator. The initiator may be used alone or in combinations thereof.

The cationic photo initiator may use any suitable cationic photo initiator, including those known to those skilled in the art. For example, the cationic photo initiator may include an onium salt including a cation and an anion. Examples of the cation may include a diaryliodonium such as diphenyliodonium, 4-methoxydiphenyliodonium, (4-methylphenyl)[(4-(2-methylpropyl)phenyl]iodonium, bis(4-methylphenyl)iodonium, bis(4-tert-butylphenyl)iodonium, bis (dodecylphenyl)iodonium; a triarylsulfonium such as triphenylsulfonium, diphenyl-4-thiophenoxyphenylsulfonium or the like; bis[4-(diphenylsulfonio)phenyl]sulfide; or the like. Examples of the anion may include hexafluorophosphate ($PF_6^-$), tetrafluoroborate ($BF_4^-$), hexafluoroantimonate ($SbF_6^-$), hexafluoroarsenate ($AsF_6^-$), hexachloroantimonate ($SbCl_6^-$), or the like.

The initiator may be present in an amount of about 0.1 wt % to about 20 wt %, specifically about 0.5 wt % to about 10 wt %, more specifically about 1 wt % to about 5 wt %, based on the total weight of the window film composition in terms of solids content. Within this range, the silicon resin may be sufficiently cured, and deteriorations in transparency of the window film due to the residual initiator may be reduced.

The composition for a window film according to embodiments of the invention may further include nanoparticles.

The nanoparticles may further improve the hardness of the window film. The nanoparticles may include at least one of silica, aluminum oxide, zirconium oxide, and titanium oxide, without being limited thereto. The nanoparticles may be partially or completely surface-treated with a silicon compound to improve miscibility with the silicon resin. The nanoparticles may have any shape and size without limitation. For example, the nanoparticles may include particles having circular, flake, amorphous shapes, or the like. The nanoparticles may have an average particle diameter of about 1 nm to about 200 nm, specifically about 10 nm to about 50 nm. Within this range, the nanoparticles may improve the hardness of the window film without adversely affecting the surface roughness and transparency of the window film. The nanoparticles may be present in an amount of about 0.1 to about 60 parts by weight, specifically about 10 to about 50 parts by weight, based on 100 parts by weight of the first silicon resin. Within this range, the nanoparticles may improve the hardness of the window film without adversely affecting the surface roughness and transparency of the window film.

The composition for a window film according to embodiments of the invention may further include an additive. The additive may provide an additional function to the window film. The additive may include any suitable additive, including those known in the art. Specifically, the additive may include at least one of a UV absorber, a reaction inhibitor, an adhesion promoter, a thixotropic agent, a conductivity imparting agent, a color regulator, a stabilizer, an antistatic agent, an antioxidant, and a leveling agent, without being limited thereto. The reaction inhibitor may include ethynylcyclohexane. The adhesion promoter may include epoxy or alkoxysilyl group-containing silane compounds. The thixotropic agent may include fumed silica or the like. The conductivity imparting agent may include powders of metals such as silver, copper, aluminum or the like. The color regulator may include a pigment, a dye or the like. The UV absorber may improve the light resistance of the window film. The UV absorber may include any suitable UV absorber, including those known to those skilled in the art. For example, the UV absorber may include at least one of triazine, benzimidazole, benzophenone and benzotriazole UV absorber, without being limited thereto. The additive may be present in an amount of about 0.01 to about 5 parts by weight, specifically about 0.1 to about 2.5 parts by weight, based on 100 parts by weight of the first silicon resin. Within this range, the additive may provide good hardness and flexibility to the window film while also realizing the advantageous effects of the additive.

The composition for a window film according to embodiments may further include a solvent for facilitating the coating, application or processing of the composition. The solvent may include at least one of methyl ethyl ketone, methyl isobutyl ketone, and propylene glycol monomethyl ether acetate, without being limited thereto.

Figure 1:
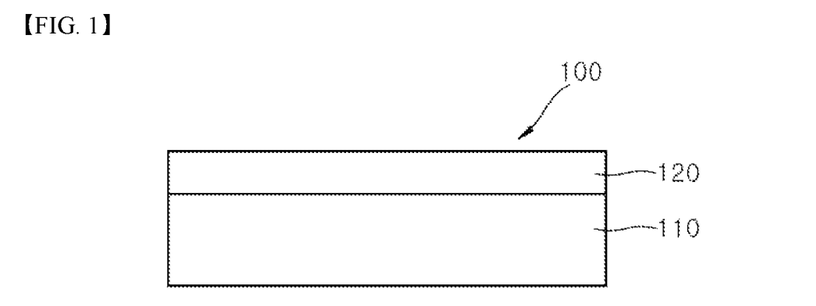
FIG. 1 is a schematic cross-sectional view of a flexible window film according to one embodiment of the invention.

Hereinafter, a flexible window film according to embodiments of the invention will be described with reference to FIG. 1. FIG. 1 is a schematic cross-sectional view of a flexible window film according to one embodiments of the invention.

Referring to FIG. 1, a flexible window film 100 according to one embodiments of the invention may include a base layer 110 and a coating layer 120, and the coating layer 120 may be formed from the composition for a window film according to embodiments of the invention.

The base layer 110 may support the flexible window film 100 and the coating layer 120, thereby improving the mechanical strength of the flexible window film 100. The base layer 110 may be attached to a display unit, a touchscreen panel, or a polarizing plate via an adhesive layer or the like. The base layer 110 may be formed of an optically transparent flexible resin. For example, the resin may include at least one of a polyester resin such as polyethylene terephthalate, polyethylene naphthalate, polybutylene terephthalate, and polybutylene naphthalate; a polycarbonate resin; a polyimide resin; a polystyrene resin; and a poly(meth)acrylate resin such as polymethyl methacrylate. The resin may be used alone or in combinations thereof in the base layer 110. The base layer 110 may have a thickness of about 10 μm to about 200 μm, specifically about 20 μm to about 150 μm, more specifically about 50 μm to about 100 μm. Within this range, the base layer 110 may be used for a flexible window film.

The coating layer 120 may be formed on one surface of the base layer 110 to protect the base layer 110, a display unit, a touchscreen panel or a polarizing plate. The coating layer 120 may be used in flexible display devices due to its high flexibility and high hardness. The coating layer 120 may have a thickness of about 5 μm to about 100 μm, specifically about 10 μm to about 80 μm. Within this range, the coating layer 120 can be used in a flexible window film. Although not shown in FIG. 1, a functional layer such as an antireflective layer, an anti-glare layer, and a hard coating layer may be further formed on the other surface of the coating layer 120 to provide an additional function to the flexible window film. In addition, although not shown in FIG. 1, the coating layer 120 may be further formed on the other surface of the base layer 110.

The flexible window film 100 may be optically transparent and may be used in transparent display devices. In some embodiments, the flexible window film 100 may have a transmittance of about 88% or more, for example about 88% to about 100%, in the visible light region, for example at a wavelength of about 400 nm to about 800 nm. Within this range, the flexible window film 100 may be used as a flexible window film. The flexible window film 100 may have a pencil hardness of about 8H or more, a radius of curvature of about 5.0 mm or less, and curl of about 10 mm or less. Within this range, the flexible window film 100 may be used due to high hardness, good flexibility, and low curl. For example, the flexible window film 100 may have a pencil hardness of about 8H to about 9H, a radius of curvature of about 0.1 mm to about 5.0 mm, and curl of about 0.5 mm to about 10 mm. The flexible window film 100 may have a thickness of about 50 μm to about 300 μm. Within this range, the flexible window film 100 may be used as a suitable flexible window film. The flexible window film 100 may be manufactured by a method that includes coating the composition for a window film according to embodiments of the invention onto the base layer 110, followed by curing the composition.

The method of coating the composition for a window film onto the base layer 110 is not particularly limited. For example, the coating method may include bar coating, spin coating, dip coating, roll coating, flow coating, die coating, or the like. The composition for a window film may be coated onto the base layer 110 to a thickness of about 5um to about 100 μm. Within this range, a desired coating layer may be obtained, and the coating layer may have high hardness and good flexibility.

Curing may allow the composition for a window film to be cured to form the coating layer, and may include at least one of photocuring and thermal curing. Photocuring may include irradiating the composition with light at a wavelength of about 400 nm or less at a dose of about 10 mJ/cm$^2$ to about 1,000 mJ/cm$^2$. Thermal curing may include treating the composition at about 40° C. to about 200° C. for about 1 hour to about 30 hours. Within this range, the composition for a window film may be sufficiently cured. For example, the composition may be subjected to photocuring, followed by thermal curing, thereby further improving the hardness of the coating layer. After the composition is coated onto the base layer 110 and before the composition is cured, the method of manufacturing a flexible window film may further include drying the composition for a window film. The composition may be dried, followed by curing, thereby reducing increases in the surface roughness of the coating layer due to photocuring or thermal curing for a long period of time. Drying may be performed at about 40° C. to about 200° C. for about 1 minute to about 30 hours, without being limited thereto.

Figure 2:
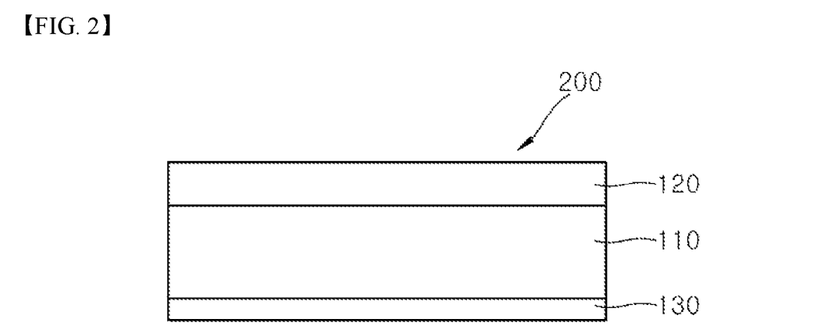
FIG. 2 is a schematic cross-sectional view of a flexible window film according to another embodiment of the invention.

Hereinafter, a flexible window film according to embodiments of the invention will be described with reference to FIG. 2. FIG. 2 is a schematic cross-sectional view of a flexible window film according to another embodiment of the invention.

Referring to FIG. 2, a flexible window film 200 according to another embodiments of the invention may include a base layer 110, a coating layer 120 formed on one surface of the base layer 110, and an adhesive layer 130 formed on the other surface of the base layer 110. The coating layer 120 may be formed of the composition for a window film according to embodiments of the invention.

The adhesive layer 130 is formed on the other surface of the base layer 110, thereby facilitating bonding of the flexible window film 200 with a touchscreen panel, a polarizing plate, or a display unit. This flexible window film 200 may be substantially the same as the flexible window film 100 described above in connection with FIG. 1 except that the flexible window film 200 further includes the adhesive layer 130. Thus, the adhesive layer 130 will now be described in below.

The adhesive layer 130 may bond a polarizing plate, a touchscreen panel or a display unit, which may be disposed on a lower portion of the flexible window film 200, to the flexible window film 200. The adhesive layer 130 may be formed of a composition for adhesive layers. For example, the adhesive layer 130 may be formed of a composition for adhesive layers, which includes an adhesive resin such as a (meth)acrylic resin, a urethane resin, a silicon resin, an epoxy resin or the like, a curing agent, a photoinitiator, and a silane coupling agent. For example, the (meth)acrylic resin may be a (meth)acrylic copolymer including an alkyl group, a hydroxyl group, an aromatic group, a carboxylic acid group, an alicyclic group, a heteroalicyclic group, or the like, and may include any suitable (meth)acrylic copolymer(s). For example, the (meth)acrylic resin may be formed of a monomer mixture including at least one of a C1 to C10 non-substituted alkyl group-containing (meth)acrylic monomer, a $C_1$ to $C_{10}$ alkyl group-containing (meth)acrylic monomer having at least one hydroxyl group, a $C_6$ to $C_{20}$ aromatic group-containing (meth)acrylic monomer, a carboxylic acid group-containing (meth)acrylic monomer, a $C_3$ to $C_{20}$ alicyclic group-containing (meth)acrylic monomer, and a $C_3$ to $C_{10}$ heteroalicyclic group-containing (meth)acrylic monomer having at least one of nitrogen (N), oxygen (O) and sulfur (S). The curing agent may be a polyfunctional (meth) acrylate, and may include bifunctional (meth)acrylates such as hexanediol diacrylate; trifunctional (meth)acrylates such as trimethylolpropane tri(meth)acrylate; tetrafunctional (meth)acrylates such as pentaerythritol tetra(meth)acrylate; pentafunctional (meth)acrylates such as dipentaerythritol penta(meth)acrylate; and hexafunctional (meth)acrylates such as dipentaerythritol hexa(meth)acrylate, without being limited thereto. The photoinitiator may be any suitable photoinitiator, and may include the above-mentioned photoradical initiators. The silane coupling agent may include an epoxy group-containing silane coupling agent such as 3-glycidoxypropyltrimethoxysilane. The composition for the adhesive layer may include 100 parts by weight of the (meth)acrylic resin, about 0.1 parts by weight to about 30 parts by weight of the curing agent, about 0.1 parts by weight to about 10 parts by weight of the photoinitiator, and about 0.1 parts by weight to about 20 parts by weight of the silane coupling agent. Within this range, the adhesive layer 130 may allow the flexible window film to be efficiently bonded to a display unit, a touchscreen panel, or a polarizing plate. The adhesive layer 130 may have a thickness of about 10 μm to about 100 μm. Within this range, the adhesive layer 130 may allow the flexible window film to be sufficiently bonded to an optical device, such as a polarizing plate or the like.

Figure 3:
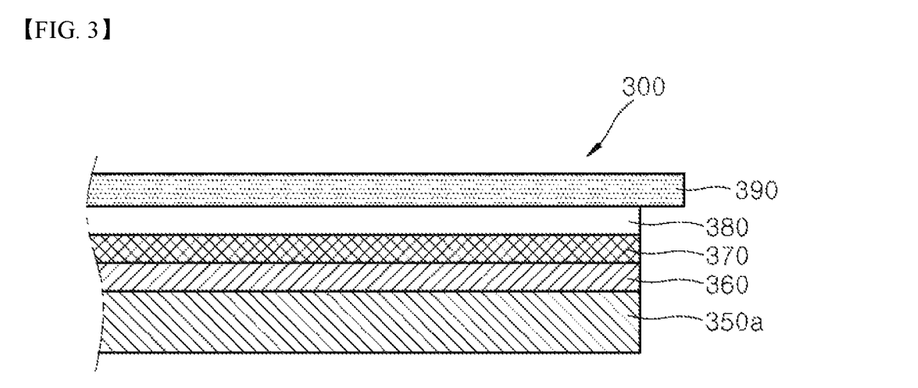
FIG. 3 is a partial cross-sectional view of a flexible display device according to one embodiment of the invention.
Figure 4:
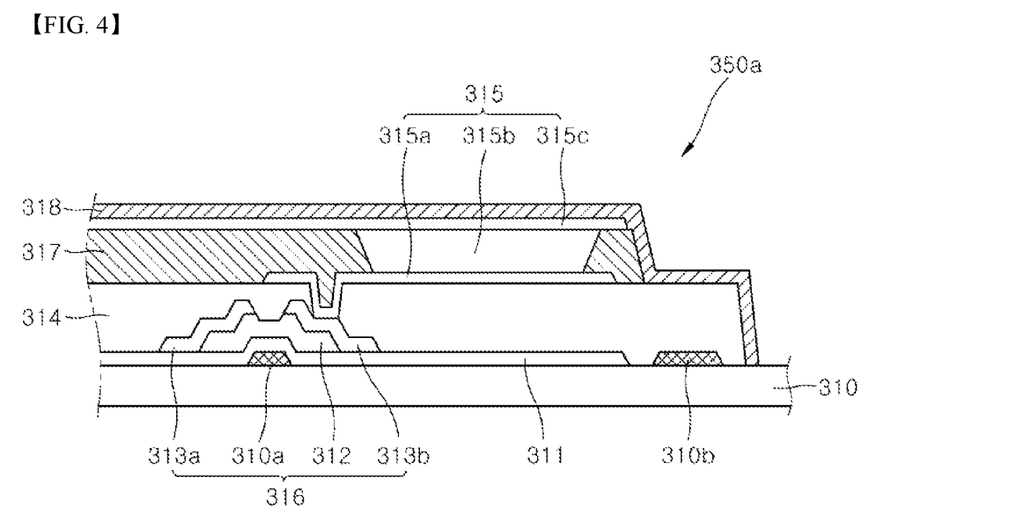
FIG. 4 is a partial cross-sectional view of a display unit of the flexible display device of FIG. 3 according to one embodiment of the invention.

A flexible display device according to embodiments of the invention will be described with reference to FIGS. 3 and 4. FIG. 3 is a partial cross-sectional view of a flexible display device according embodiments of the invention, and FIG. 4 is a partial cross-sectional view of a display unit of the flexible display device of FIG. 3 according to embodiments of the invention.

Referring to FIG. 3, a flexible display device 300 according to embodiments of the invention may include a display unit 350a, an adhesive layer 360, a polarizing plate 370, a touchscreen panel 380, and a flexible window film 390. The flexible window film 390 may include the flexible window film according to the embodiments of the invention.

The display unit 350a may drive the flexible display device 300. The display unit 350a may include a substrate, and an optical element such as an OLED, LED or LCD formed on the substrate. FIG. 4 is a partial cross-sectional view of the display unit of the flexible display device of FIG. 3 according to embodiments of the invention. Referring to FIG. 4, the display unit 350a may include a lower substrate 310, a thin film transistor 316, an organic light emitting diode 315, a planarization layer 314, a protective film 318, and an insulating film 317.

The lower substrate 310 may support the display unit 350a. The thin film transistor 316 and the organic light emitting diode 315 may be formed on the lower substrate 310. A flexible printed circuit board (FPCB) for driving the touchscreen panel 380 may be formed on the lower substrate 310. A timing controller, a power supply or the like for driving the organic light emitting diode array may be further formed on the flexible printed circuit board.

The lower substrate 310 may include a substrate formed of a flexible resin. For example, the lower substrate 310 may include a flexible substrate such as a silicon substrate, a polyimide substrate, a polycarbonate substrate, a polyacrylate substrate or the like, without being limited thereto.

In the display region of the lower substrate 310, a plurality of pixel regions may be defined by intersecting of a plurality of driving wires (not shown) and a plurality of sensor wires (not shown). An organic light emitting diode array including the thin film transistor 316 and the organic light emitting diode 315 connected to the thin film transistor 316 may be formed in each of the pixel regions. In the non-display region of the lower substrate 310, a gate driver for applying an electrical signal to the driving wires may be formed in a gate-in-panel form. A gate-in-panel circuit may be formed at one or both sides of the display region.

The thin film transistor 316 may control electric current of a semiconductor by application of an electric field perpendicular to the current flowing in the semiconductor. The thin film transistor 316 may be formed on the lower substrate 310. The thin film transistor 316 may include a gate electrode 310a, a gate insulating film 311, a semiconductor layer 312, a source electrode 313a, and a drain electrode 313b. The thin film transistor 316 may be an oxide thin film transistor including an oxide such as indium gallium zinc oxide (IGZO), zinc oxide (ZnO), titanium oxide (TiO) or the like as the semiconductor layer 312, an organic thin film transistor including an organic material as the semiconductor layer, an amorphous silicon thin film transistor including amorphous silicon as the semiconductor layer, or a polycrystalline silicon thin film transistor including polycrystalline silicon as the semiconductor layer.

The planarization layer 314 may cover the thin film transistor 316 and a circuit portion 310b to flatten the upper portions of the thin film transistor 316 and the circuit portion 310b, thereby allowing the organic light emitting diode 315 to be formed. The planarization layer 314 may be formed of a spin-on-glass (SOG) film, a polyimide polymer, a polyacrylic polymer or the like, without being limited thereto.

The organic light emitting diode 315 may emit light to display an image, and may include a first electrode 315a, an organic light emitting layer 315b, and a second electrode 315c, which are sequentially stacked, one above the other. Adjacent organic light emitting diodes may be separated from each other by the insulating film 317. The organic light emitting diode 315 may have a bottom emission structure in which light generated in the organic light emitting layer 315b is emitted through the lower substrate, or a top emission structure in which light generated in the organic light emitting layer 315b is emitted through an upper portion.

The protective film 318 may cover the organic light emitting diode 315 to protect the organic light emitting diode 315. The protective film 318 may be formed of an inorganic material such as SiOx, SiNx, SiC, SiON, SiONC and amorphous carbon (a-C), and/or an organic material such as (meth)acrylates, epoxy polymers, and imide polymers. For example, the protective film 318 may include an encapsulation layer in which a layer including an inorganic material and a layer including an organic material are alternately stacked to form one or more dyads.

Referring again to FIG. 3, the display unit 350a is bonded to the polarizing plate 370 via the adhesive layer 360. The adhesive layer 360 may be formed of an adhesive composition including a (meth)acrylate resin, a curing agent, an initiator and a silane coupling agent.

The polarizing plate 370 may polarize internal light or prevent reflection of external light, thereby displaying an image or improving contrast of the displayed image. The polarizing plate may include a polarizer alone. In another example, the polarizing plate may include a polarizer and a protective film formed on one or both surfaces of the polarizer. In another example, the polarizing plate may include a polarizer and a protective coating layer formed on one or both surfaces of the polarizer. The polarizer, the protective film, and the protective coating layer may be any suitable polarizer, suitable protective film, and suitable protective coating layer known to those skilled in the art.

The touchscreen panel 380 may generate an electrical signal by sensing changes in capacitance generated when a human body or a conductor such as a stylus touches the touchscreen panel, and the display unit 350*a* may be driven by the signal. The touchscreen panel 380 is formed by patterning a flexible and conductive conductor, and may include first sensor electrodes, and second sensor electrodes each formed between the first sensor electrodes and intersecting the first sensor electrodes. The conductor for the touchscreen panel 380 may include metal nanowires, conductive polymers, carbon nanotubes or the like, without being limited thereto.

The flexible window film 390 may be formed at an outermost portion of the flexible display device 300 to protect the display.

Although not shown in FIG. 3, an adhesive layer may be further formed between the polarizing plate 370 and the touchscreen panel 380, and/or between the touchscreen panel 380 and the flexible window film 390, thereby reinforcing bonding between the polarizing plate, the touchscreen panel, and the flexible window film. The adhesive layer may be formed of an adhesive composition including a (meth)acrylate resin, a curing agent, an initiator, and a silane coupling agent. Although not shown in FIG. 3, a polarizing plate may be further formed on a lower portion of the display unit 350*a*, thereby enabling polarization of internal light.

Figure 5:
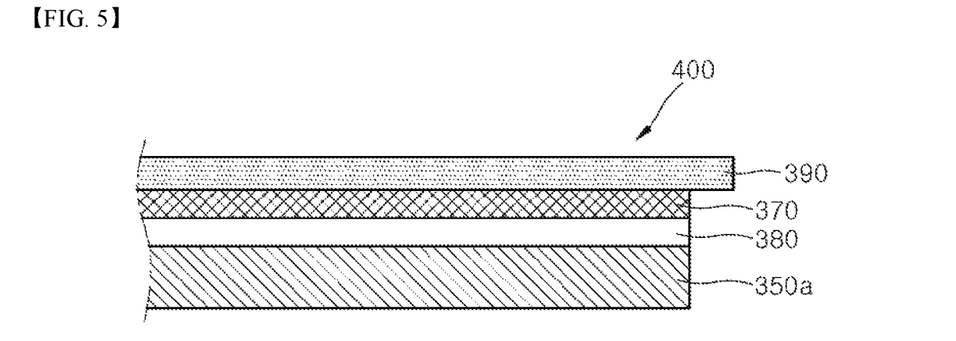
FIG. 5 is a partial cross-sectional view of a flexible display device according to another embodiment of the invention.

A flexible display device according to another embodiment of the invention will be described with reference to FIG. 5. FIG. 5 is a partial cross-sectional view of a flexible display device according to another embodiment of the invention.

Referring to FIG. 5, a flexible display device 400 according to embodiments of the invention may include a display unit 350*a*, a touchscreen panel 380, a polarizing plate 370, and a flexible window film 390. The flexible window film 390 may include the flexible window film according to embodiments of the invention. The flexible display device 400 depicted in FIG. 5 may be substantially the same as the flexible display devices described above except that the touchscreen panel 380 is not formed directly on one surface of the flexible window film 390, but is formed on a lower portion of the polarizing plate 370. Here, the touchscreen panel 380 may be formed together with the display unit 350*a*. In this case, the touchscreen panel 380 may be formed integrally with the display unit 350*a*, enabling the flexible display device 400 to have a thinner thickness and higher brightness, and thus better visibility than the flexible display devices described above. In addition, the touchscreen panel 380 may be formed by deposition or the like, without being limited thereto. Although not shown in FIG. 5, an adhesive layer may be further formed between the display unit 350*a* and the touchscreen panel 380, between the touchscreen panel 380 and the polarizing plate 370, and/or between the polarizing plate 370 and the flexible window film 390, thereby improving the mechanical strength of the display device. The adhesive layer may be formed of an adhesive composition including a (meth)acrylate resin, a curing agent, an initiator, and a silane coupling agent. Although not shown in FIG. 5, a polarizing plate may be further formed on a lower portion of the display unit 350*a*, thereby improving the displayed image by polarizing internal light.

Figure 6:
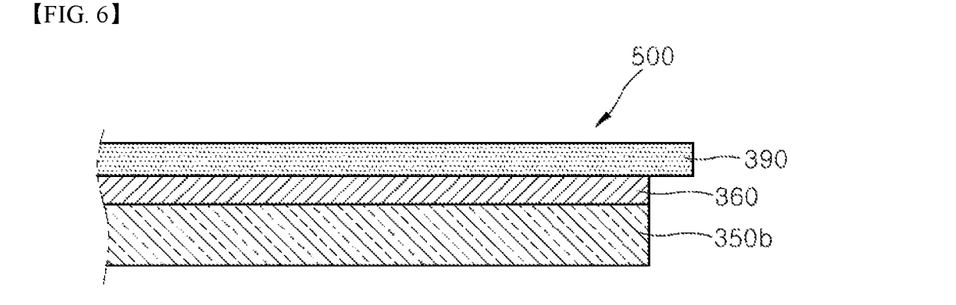
FIG. 6 is a partial cross-sectional view of a flexible display device according to other embodiments of the invention.

A flexible display device according to other embodiment of the invention will be described with reference to FIG. 6. FIG. 6 is a partial cross-sectional view of a flexible display device according to other embodiment of the invention. Referring to FIG. 6, a flexible display device 500 according to embodiments of the invention may include a display unit 350*b*, an adhesive layer 360, and a flexible window film 390. The flexible window film 390 may include the flexible window film according to embodiments of the invention. The flexible display device 500 may be substantially the same as the flexible display devices described above except that the display device can be driven only by the display unit 350*b*, and the polarizing plate and touchscreen panel are omitted.

The display unit 350*b* may include a substrate, and an optical element such as an LCD, OLED or LED formed on the substrate. In addition, the display unit 350*b* may include a touchscreen panel therein.

Although the flexible display devices including the window films according to the embodiments of the invention have been described above, it should be understood that the window films according to the embodiments of the invention may also be applied to non-flexible display devices.

Hereinafter, the invention will be described in more detail with reference to some examples. It should be understood that these examples are provided for illustration only and are not to be construed in any way as limiting the invention.

PREPARATION EXAMPLE 1

First Silicon Resin 250 g of 3-glycidoxypropyltrimethoxysilane (KBM-403, Shin-Etsu Chemical Co., Ltd.) was placed in a 1,000 ml 3-neck flask. Based on the amount of 3-glycidoxypropyltrimethoxysilane, 0.5 mol % of KOH and 1.5 mol % of water were added thereto, followed by stirring at 65° C. for 2 hours. A first silicon resin was prepared by removing residual solvent using a vacuum distillation apparatus, followed by adding methylethylketone thereto, thereby adjusting the amount of the first silicon resin to 90% by weight (wt %) in terms of solids content. The weight average molecular weight of the first silicon resin measured by gel permeation chromatography was 6,800.

PREPARATION EXAMPLE 2

First Silicon Resin 250 g of a silicon monomer mixture including 95 mol % of 3-glycidoxypropyltrimethoxysilane and 5 mol % of dimethyldimethoxysilane were placed in a 1,000 ml 3-neck flask. Based on the amount of the silicon monomer mixture, 0.5 mol % of KOH and 1.45 mol % of water were added thereto, followed by stirring at 65° C. for 2 hours. A first silicon resin was prepared by removing residual solvent using a vacuum distillation apparatus, followed by adding methylethylketone thereto, thereby adjusting the amount of the first silicon resin to 90% by weight (wt %) in terms of solids content. The weight average molecular weight of the first silicon resin measured by gel permeation chromatography was 5,400.

PREPARATION EXAMPLE 3

First Silicon Resin

A silicon resin was prepared in the same manner as in Preparation Example 1 except that 100 mol % of 2-(3,4-epoxycyclohexyl)ethyltrimethoxysilane was used instead of 3-glycidoxypropyltrimethoxysilane.

PREPARATION EXAMPLE 4

First Silicon Resin

A silicon resin was prepared in the same manner as in Preparation Example 1 except that 95 mol % of 2-(3,4- epoxycyclohexyl)ethyltrimethoxysilane and 5 mol % of dimethyldimethoxysilane were used instead of 3-glycidoxypropyltrimethoxysilane.

PREPARATION EXAMPLE 5

Second Silicon Resin 12.42 g of a mixture including 90 mol % of Hydride Q resin (HQM-107, Gelest, Inc.) and 10 mol % of 4-vinyl-1-cyclohexene 1,2-epoxide (Sigma-Aldrich Corporation) were added to toluene, followed by being purged with nitrogen. As a platinum catalyst PT-CS-1.8CS (Umicore) having 300 ppm of platinum content was added to the mixture. The mixture was reacted under a nitrogen atmosphere at 60° C. for 2 hours to prepare a second silicon resin including a Q unit, as represented by following Formula 5-1. The weight average molecular weight of the second silicon resin measured by gel permeation chromatography was 3,200.

<Formula 5-1>

(In Formula 5-1, * is a connecting portion of an element).

PREPARATION EXAMPLE 6

Second Silicon Resin

A mixture including 60 mol % of 1,2-bis(triethoxysilyl)ethane and 40 mol % of 1,1,3,3-tetramethyldisiloxane (Gelest, Inc.) was placed in a 1,000 ml 3-neck flask. Based on the amount of the mixture, 0.5 mol % of p-toluenesulfonic acid was added as an acid catalyst, and based on the amount of an alkoxy group in the monomer mixture, 6 mol % of water was added thereto. The mixture was stirred at 40° C. for 12 hours, followed by removing toluene using a vacuum distillation apparatus, and neutralization with distilled water. Magnesium sulfate was added to the mixture to remove water.

Based on 100 mol % of the mixture, 1 mol % of 4-vinyl-1-cyclohexene 1,2-epoxide (Sigma-Aldrich Corporation) was added to mixture, followed by being purged with nitrogen. As a platinum catalyst PT-CS-1.8CS (Umicore) having 300 ppm of platinum content was added to the mixture. The mixture was reacted under a nitrogen atmosphere at 60° C. for 2 hours to prepare a second silicon resin including a bridge unit, as represented by following Formula 6-2. The weight average molecular weight of the second silicon resin measured by gel permeation chromatography was 3,600.

<Formula 6-2>

(In Formula 6-2, * is a connecting portion of an element)

The detailed compositions of the silicon resins of Preparations Examples 1 to 6 are listed in Table 1.

TABLE 1

| Silicon monomer (mol %) | Preparation Example 1 | Preparation Example 2 | Preparation Example 3 | Preparation Example 4 | Preparation Example 5 | Preparation Example 6 |
| --- | --- | --- | --- | --- | --- | --- |
| 3-glycidoxypropyltrimethosysilane | 100 | 95 | — | — | — | — |
| dimethyldimethoxysilane | — | 5 | — | — | — | — |
| 2-(3,4-epoxycyclohexyl)ethyltriethoxysilane | — | — | 100 | 95 | — | — |
| HQM-107 | — | — | — | — | 90 | — |
| 1,2-bis(triethoxysilyl)ethane | — | — | — | — | — | 60 |
| 1,1,3,3-tetramethyldisiloxane | — | — | — | — | — | 40 |
| 4-vinyl-1-cyclohexene 1,2-epoxide | — | — | — | — | 10 | 1 |
| weight average molecular weight | 6,800 | 5,400 | 6,200 | 5,800 | 3,200 | 3,600 |

EXAMPLE 1

80 parts by weight of the first silicon resin prepared in Preparation Example 1, 5 parts by weight of the second silicon resin prepared in Preparation Example 5, 10 parts by weight of CY-179 (Ciba Co., Ltd.) as a crosslinking agent, and 5 parts by weight of Irgacure-250 (BASF Co., Ltd.) as an initiator were mixed, thereby preparing a composition for a window film. The prepared composition for a window film was coated onto a polyethylene terephthalate film (TA043, Toyobo Co., Ltd., thickness: 80 μm), followed by drying at 80° C. for 4 minutes. Next, the composition was subjected to UV irradiation at a dose of 1000 mJ/cm$^2$, followed by heating at 80° C. for 4 hours, thereby manufacturing a window film including a 50 μm thick coating layer.

EXAMPLES 2 to 6

Each of the window films of Examples 2 to 6 was manufactured in the same manner as in Example 1, except that the first silicon resin and the second silicon resin were used as listed in Table 2.

EXAMPLE 7

75 parts by weight of the first silicon resin prepared in Preparation Example 1, 10 parts by weight of the second silicon resin prepared in Preparation Example 5, 10 parts by weight of diglycidyl 1,2-cyclohexanedicarboxylate (DCD, Sigma-Aldrich Corporation) as a crosslinking agent, and 5 parts by weight of Irgacure-250 (BASF Co., Ltd.) as an initiator were mixed, thereby preparing a composition for a window film. The prepared composition for a window film was coated onto a polyethylene terephthalate film (TA043, Toyobo Co., Ltd., thickness: 80 μm), followed by drying at 80° C. for 4 minutes. Next, the composition was subjected to UV irradiation at a dose of 1000 mJ/cm$^2$, followed by heating at 80° C. for 4 hours, thereby manufacturing a window film including a 50 μm thick coating layer

EXAMPLES 8 TO 12 AND COMPARATIVE EXAMPLES 1 TO 2

Each of the window films of Examples 8 to 12 and Comparative Examples 1 to 2 was manufactured in the same manner as in Example 1 or Example 7, except that the first silicon resin, the second silicon resin, and the crosslinking agent were used as listed in Table 2.

Each of the window film manufactured according to Examples and Comparative Examples was evaluated as to the following properties (1) to (3). The results are shown in Tables 2 and 3.

(1) Pencil hardness: Pencil hardness was measured on the coating layer of the window film using a pencil hardness tester (Heidon Co., Ltd.) in accordance with JIS K5400. A pencil (Mitsubishi Co., Ltd.) having a pencil hardness of 6B to 9H was used. Pencil hardness was measured under a load of 1 kg on the coating layer, a scratching angle of 45°, and a scratching speed of 60 mm/min. When the coating layer had one or more scratches after being tested 5 times using a certain pencil, the pencil hardness was measured again using another pencil having one-level lower hardness than the previous pencil. The maximum pencil hardness value of the pencil that allowed no scratches to be observed after repeating the pencil hardness measurement five times on the coating layer was taken as the pencil hardness of the coating layer.

(2) Radius of curvature: The window film (width×length× thickness: 3 cm×15 cm×130 μm, base layer thickness: 80 μm, coating layer thickness: 50 μm) was wound around a jig (CFT-200R, Covotech Co., Ltd.) for testing radius of curvature, followed by keeping the window film wound for at least 5 seconds, and then unwinding the film from the jig. Next, the window film was observed by the naked eye as to whether the window film suffered from cracking. Here, the radius of curvature in the compressive direction was measured when the window film was wound around the jig such that the coating layer of the window film contacted the jig. The radius of curvature in the tensile direction was measured when the window film was wound around the jig such that the base layer of the window film contacted the jig. Measurement of the radius of curvature in the compressive direction was performed while the diameter of the jig was gradually decreased from a maximum diameter, and the minimum radius of the jig causing no observable cracks in the window film was recorded as the radius of curvature of the window film.

(3) Curl: Referring to FIG. 7, each of the window films including an 80 μm thick base layer and a 50 μm thick coating layer prepared in Examples and Comparative Examples was cut into a size of 10 cm×10 cm (width× height), followed by being left on a floor 2 under the condition of 25° C. and 40% relative humidity. The maximum height H from the floor 2 to the corner of the window film 1 was measured repeatedly, followed by averaging the measured numbers.

TABLE 2

| | | Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| The first silicon resin (parts by weight) | Preparation Example 1 | 80 | 75 | 80 | 75 | — | — | 75 | 75 | — | — | — | — |
| | Preparation Example 2 | — | — | — | — | 75 | 75 | — | — | — | — | — | — |
| | Preparation Example 3 | — | — | — | — | — | — | — | — | 80 | — | 80 | — |
| | Preparation Example 4 | — | — | — | — | — | — | — | — | — | 75 | — | 75 |
| The second silicon resin (parts by weight) | Preparation Example 5 | 5 | 10 | — | — | 10 | — | 10 | — | 5 | 10 | — | — |
| | Preparation Example 6 | — | — | 5 | 10 | — | 10 | — | 10 | — | — | 5 | 10 |

TABLE 2-continued

| | | Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Cross linking agent (parts by weight) | CY-179 | 10 | 10 | 10 | 10 | 10 | 10 | — | — | 10 | 10 | 10 | 10 |
| | DCD | — | — | — | — | — | — | 10 | 10 | — | — | — | — |
| | Initiator (parts by weight) | 5 | 5 | 5 | 5 | 5 | 5 | 5 | 5 | 5 | 5 | 5 | 5 |
| | Pencil hardness | 8H | 8H | 8H | 8H | 8H | 8H | 8H | 8H | 8H | 8H | 8H | 8H |
| | Radius of curvature (mm) | 2 | 2 | 3 | 2 | 1.5 | 1.5 | 2 | 2 | 5.0 | 4.5 | 5.0 | 5.0 |
| | Curl (mm) | 5.0 | 4 | 4.8 | 4.2 | 5.0 | 4.5 | 1.8 | 2.0 | 1.0 | 1.5 | 0.8 | 1.6 |

TABLE 3

| | | Comparative Example 1 | Comparative Example 2 |
|---|---|---|---|
| The first silicon resin (parts by weight) | Preparation Example 1 | 85 | — |
| | Preparation Example 2 | — | 85 |
| The second silicon resin (parts by weight) | Preparation Example 5 | — | — |
| | Preparation Example 6 | — | — |
| Crosslinking agent (parts by weight) | CY-179 | 10 | 10 |
| | DCD | — | — |
| Initiator (parts by weight) | | 5 | 5 |
| Pencil hardness | | 5H | 4H |
| Radius of curvature (mm) | | 2 | 2 |
| Curl (mm) | | 10 | 14 |

As shown in Table 2, each of the window films according to embodiments of the invention had high hardness such as a pencil hardness of 8H or higher, good flexibility such as a radius of curvature of 5.0 mm or less, and low curl. Thus, the window films according to embodiments of the invention could be used as flexible window films. Conversely, as shown in Table 3, each of the window films of Comparative Example 1 and 2 which does not include the second silicon resin had good flexibility, but poor pencil hardness compared to the window films according to embodiments of the invention.

While certain embodiments of the invention have been illustrated and described, it is understood that various modifications, changes, alterations, and equivalent embodiments can be made by those skilled in the art without departing from the spirit and scope of the invention, as defined in the following claims. It should be understood that various modifications, changes, alterations, and equivalent embodiments can be made by those skilled in the art without departing from the spirit and scope of the invention.

The invention claimed is:

1. A composition for a window film comprising:
   a first silicon resin comprising a compound represented by following Formula 1;
   a second silicon resin comprising a crosslinkable functional group and at least one of a Q unit and a bridge unit;
   a crosslinking agent; and
   an initiator, $$(R^1SiO_{3/2})_x(R^2R^3SiO_{2/2})_y(R^4R^5R^6SiO_{1/2})_z \quad \text{<Formula 1>}$$

(wherein in Formula 1,
$R^1$ is an epoxy group, or an epoxy-group containing functional group,
$R^2$ and $R^3$ are each independently hydrogen, a crosslinkable functional group, a substituted or non-substituted $C_1$ to $C_{20}$ alkyl group, or a substituted or non-substituted $C_5$ to $C_{20}$ cycloalkyl group,
$R^4$, $R^5$ and $R^6$ are each independently hydrogen, a crosslinkable functional group, a substituted or non-substituted $C_1$ to $C_{20}$ alkyl group, a substituted or non-substituted $C_5$ to $C_{20}$ cycloalkyl group, or a substituted or non-substituted $C_6$ to $C_{30}$ aryl group, at least one of $R^4$, $R^5$ and $R^6$ is a crosslinkable functional group,
$0 < x \leq 1$, $0 \leq y < 1$, $0 \leq z < 1$, and $x+y+z=1$).

2. The composition of claim 1, wherein the second silicon resin comprises a compound represented by any one of following Formulae 5 and 6:

<Formula 5>

(wherein in Formula 5,
* is a connecting portion of an element,
$R^{12}$, $R^{13}$, $R^{14}$, $R^{15}$, $R^{16}$ and $R^{17}$ are each independently a crosslinkable functional group, or a substituted or non-substituted $C_1$ to $C_{10}$ alkyl group,
at least one of $R^{12}$, $R^{13}$ and $R^{14}$ is a crosslinkable functional group,
at least one of $R^{15}$, $R^{16}$ and $R^{17}$ is a crosslinkable functional group, and
n is an integer of 10 to 200), <Formula 6>

(wherein in Formula 6,
* is a connecting portion of an element,
$R^{18}$ is a substituted or non-substituted $C_1$ to $C_{20}$ alkylene group, a substituted or non-substituted $C_2$ to $C_{20}$ alkenylene group, a substituted or non-substituted $C_2$ to $C_{20}$ alkynylene group, a substituted or non-substituted $C_6$ to $C_{20}$ arylene group, a substituted or non-substituted $C_7$ to $C_{30}$ arylalkylene group, or a substituted or non-substituted $C_3$ to $C_{20}$ cycloalkylene group,

$R^{12}$, $R^{13}$, $R^{14}$, $R^{15}$, $R^{16}$ and $R^{17}$ are as defined in Formula 5 above, and n is an integer of 15 to 120).

3. The composition of claim 1, wherein the second silicon resin comprises a compound represented by at least one of following Formulae 5-1, 5-2, 6-1, and 6-2:

<Formula 5-1>

<Formula 5-2>

(wherein in Formulae 5-1 and 5-2,
* is a connecting portion of an element, and
n is an integer of 10 to 200), <Formula 6-1>

<Formula 6-2>

(wherein in Formulae 6-1 and 6-2,
* is a connecting portion of an element, and
n is an integer of 15 to 120).

4. The composition of claim 1, wherein the second silicon resin is present in an amount of about 0.1 wt % to about 50 wt % based on a total weight of the composition for a window film, in terms of solids content.

5. The composition of claim 1, wherein $R^1$ is a glycidoxy group-containing $C_1$ to $C_{20}$ alkyl group, or an epoxidized $C_5$ to $C_{20}$ cycloalkyl group-containing $C_1$ to $C_{20}$ alkyl group, and y and z are zero, respectively.

6. The composition of claim 1, wherein the first silicon resin is represented by any one of following Formulae 1-2A to 1-2H, $(GpSiO_{3/2})_x(EcMeSiO_{2/2})_y$   <Formula 1-2A>

$(GpSiO_{3/2})_x((Me)_2SiO_{2/2})_y$   <Formula 1-2B>

$(GpSiO_{3/2})_x(MeEtSiO_{2/2})_y$   <Formula 1-2C>

$(GpSiO_{3/2})_x(GpMeSiO_{2/2})_y$   <Formula 1-2D>

$(EcSiO_{3/2})_x(EcMeSiO_{2/2})_y$   <Formula 1-2E>

$(EcSiO_{3/2})_x((Me)_2SiO_{2/2})_y$   <Formula 1-2F>

$(EcSiO_{3/2})_x(MeEtSiO_{2/2})_y$   <Formula 1-2G>

$(EcSiO_{3/2})_x(GpMeSiO_{2/2})_y$   <Formula 1-2H>

(wherein in Formulae 1-2A to 1-2H,
Gp is a glycidoxypropyl group,
Ec is an epoxycyclohexylethyl group,
Me is a methyl group,
Et is an ethyl group,
$0<x<1$, $0<y<1$, and $x+y=1$).

7. A flexible window film comprising:
a base layer; and
a coating layer formed on at least one surface of the base layer,
wherein the coating layer is formed from the composition for a window film according to claim 1.

8. The film of claim 7, further comprising an adhesive layer formed on another surface of the base layer.

9. A flexible display device comprising the flexible window film of claim 7.

10. The device of claim 9, wherein the flexible display device comprises:
a display unit;
an adhesive layer formed on the display unit;
a polarizing plate formed on the adhesive layer;
a touchscreen panel formed on the polarizing plate; and
the flexible window film formed on the touchscreen panel.

11. The device of claim 9, wherein the flexible display device comprises:
a display unit;
a touchscreen panel formed on the display unit;
a polarizing plate formed on the touchscreen panel; and
the flexible window film formed on the polarizing plate.

12. The device of claim 9, wherein the flexible display device comprises:
a display unit;
an adhesive layer formed on the display unit; and
the flexible window film formed on the adhesive layer.

13. The device of claim 9, further comprising a polarizing plate on an upper portion or a lower portion of the display unit.

\* \* \* \* \*